United States Patent [19]
Campbell et al.

[11] 3,719,641
[45] March 6, 1973

[54] POLYCARBONAMIDE HAVING IMPROVED BASIC DYE RECEPTIVITY

[75] Inventors: Norman Bernard Campbell; Ross Nelson Frederick Wells, both of Arnprior, Ontario, Canada

[73] Assignee: Union Carbide Canada Limited, Toronto, Ontario, Canada

[22] Filed: Feb. 1, 1971

[21] Appl. No.: 111,671

Related U.S. Application Data

[63] Continuation-in-part of Ser. No. 776,855, Nov. 12, 1968, abandoned.

[52] U.S. Cl. ............260/78 A, 8/178 R, 260/78 R, 260/78 L, 260/78 S, 260/78 SC, 260/78 TF
[51] Int. Cl. ..........................C08g 20/06, C08g 20/12
[58] Field of Search........260/78 R, 78 A, 78 L, 78 S, 260/78 SC

[56] References Cited

UNITED STATES PATENTS

| | | | |
|---|---|---|---|
| 2,241,322 | 5/1941 | Hanford | 260/78 L |
| 3,078,248 | 2/1963 | Ben | 260/78 L |
| 3,216,976 | 11/1965 | Schwartz et al. | 260/78 L |
| 3,240,759 | 3/1966 | Crovatt et al. | 260/78 UA |
| 3,386,967 | 6/1968 | Twilley | 260/78 L |

FOREIGN PATENTS OR APPLICATIONS 1,032,211   10/1959   Germany

*Primary Examiner*—Harold D. Anderson
*Attorney*—William George Hopley

[57] ABSTRACT

Nylon filaments are made more respective to basic dyes and differentially dye with basic dye in a bath containing acid and basic dyes by mixing the nylon with from 0.3 to 1.0 weight percent of glutaric acid, methyltetrahydrophthalic acid or 1,3,5-tricarboxypentane or alternatively with from 0.3 to 2.0 weight percent of glutaric anhydride, methyltetrahydrophthalic anhydride, $\alpha$-2(2-carboxyethyl)glutaric anhydride or succinic anhydride.

6 Claims, No Drawings

POLYCARBONAMIDE HAVING IMPROVED BASIC DYE RECEPTIVITY

This is a continuation-in-part of application Ser. No. 776,855 filed Nov. 12, 1968 now abandoned.

This invention relates to nylon filaments having improved dyeability. More particularly, it relates to polycaproamide compositions mixed with certain polycarboxylic compounds and to improved receptivity of the polycaproamide to basic dyes.

Attempts have been made by others in the past to prepare a polyamide composition containing certain additives to improve the receptivity of the polyamide to one type of dye over another. For example, Canadian Pat. No. 750,461 of E.E. Magat discloses a polyamide fiber mixed with poly(N-vinyl amide) and poly(alkylene ether) to improve dyeability. Canadian Pat. No. 790,118 of E.P. Brignac et al. shows a nylon-66 fiber having improved dyeability which is mixed with hexamethylene diammonium phenylphosphinate and toluene sulfonamide. However, the blending of these polyamide mixtures are either more advantageously carried out during the polymerization step, or do not differentiate between the receptivity of acid and basic dyes, or are more costly or cumbersome to prepare.

Canadian Pat. No. 674,887 of V. Cappuccio et al. describes a method of improving the dyeability of polyolefin fibers by mixing the polyolefin with a dicarboxylic acid or its derivative. However most dicarboxylic compounds including some dicarboxylic acids particularly mentioned by Cappuccio have a detrimental effect on the physical properties of polyamide fiber. For example, adipic acid when mixed with polyamide in an amount required to give satisfactory basic dye receptivity gave a composition which when spun into a filament had poor strength retention under u.v. radiation.

It has now been discovered that nylon such as polycaproamide (nylon-6) or polyhexamethylene adipamide (nylon 6/6) can be made receptive to basic dyes and can differentiate between basic dyes and acid dyes in the same bath by mixing and extruding the nylon with from 0.3 to 2.0 mole percent of certain polycarboxylic compounds. By utilizing compounds that can be mixed just prior to extrusion rather than actually blending before the polymerization is completed, the polycarboxylic compound can be metered into the nylon chip stream just ahead of the extruder to vary the dyeability of the nylon product. Additives which are blended at the polymerization stage require a separate polymerization batch, or costly process changes if a continuous process is employed, for each type of dye receptive nylon.

It is therefore an object of this invention to produce a polyamide filament having improved receptivity to basic dyes while maintaining good strength retention.

It is another object of this invention to provide a polyamide filament capable of differentially dyeing in a bath containing an acid dye and basic dye mixture.

These objects are obtained by providing a nylon filament having improved basic dye receptivity and desirable strength retention properties which consists essentially of: a polyamide selected from the group consisting of polycaproamide and polyhexamethylene adipamide, said polyamide having blended therein a polycarboxylic compound selected from the group consisting of glutaric acid, methyltetrahydrophthalic acid, 1,3,5-tricarboxypentane, glutaric anhydride, methyltetrahydrophthalic anhydride, α-2(2-carboxyethyl)glutaric anhydride and succinic anhydride in an amount of:

a. from 0.3 to 1.0 weight percent of polycarboxylic compound based on the weight of polyamide when said polycarboxylic compound is one selected from the group consisting of glutaric acid, methyltetrahydrophthalic acid and 1,3,4-tricarboxypentane.

b. from 0.3 to 2.0 weight percent of polycarboxylic compound based on the weight of polyamide when said polycarboxylic compound is one selected from the group consisting of glutaric anhydride, methyltetrahydrophthalic anhydride, α-2(2-carboxyethyl)glutaric anhydride and succinic anhydride.

It was found in extruding the polyamide such as polycaproamide with the polycarboxylic compound that good mixing for even dye receptivity was obtained in extruders having a length/diameter ratio of 17 or higher and a residence time of 5 minutes or more. Best results were obtained using an extruder having a length/diameter ratio of 20 and a residence time of 6 minutes.

It was also found that nylon-6 or nylon than 6/6 mixed with less than weight percent of polycarboxylic compound gave less than satisfactory basic dye receptivity. While mixtures above 2.0 weight percent of the anhydride continued to show good basic dye receptivity, the strength of the filaments were adversely affected. A preferred range for the anhydride of the polycarboxylic compound is from 0.3 to 0.7 weight percent. When the acid of the polycarboxylic compound is used, amounts above 1.0 weight percent has an adverse effect on the composition; this presumed due to the production of water when the acid reacts with the amine groups of the polycaproamide during intimate mixing.

It was found that polycarboxylic compound selected from glutaric acid, glutaric anhydride, methyltetrahydrophthalic acid, methyltetrahydrophthalic anhydride, 1,3,5-tricarboxypentane, α-2(2-carboxyethyl)glutaric anhydride, succinic acid and succinic anhydride provided suitable basic dye receptivity within the weight percentages mentioned above. While these polycarboxylic compounds have some detrimental effect on the physical properties of polycaproamide and polyhexamethylene adipamide this detrimental effect is tolerable at the quantities of polycarboxylic compound stated above. Other polycarboxylic compounds such as adipic acid for example would reduce the strength retention of the yarn after exposure to ultra violet light at the quantities necessary to provide basic dye receptivity. Evaluation of a large number of polycarboxylic compounds in the acid and anhydride form gave acceptable basic dye receptivity to polycaproamide without seriously effecting the physical properties of the polycaproamide at the stated quantity range. However, as indicated below, the addition of succinic acid at 1 percent concentration did not provide acceptable tensile strength in the filament. The anhydride on the other hand gives good dyeability without loss of tensile strength below acceptable limits.

The 1,3,5-tricarboxypentane mentioned above is sometimes referred to as octric acid and has the formula HOOC-$(CH_2)$-CH(COOH)-$(CH_2)$-COOH. The corresponding anhydride is α-2(2-carboxyethyl)glutaric anhydride and may be represented by the formula

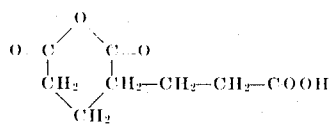

A carpet tufted with polycaproamide (nylon-6) or polyhexamethylene adipamide (nylon 6/6) filaments mixed with one of the disclosed additives can be rendered receptive to a basic dye (cationic dye) such as Severon Red L. and Severon Blue 26. It should be noted that filaments having the above polycarboxylic compounds mixed therewith also do not take up an acid dye to the same extent as will an untreated nylon-6 or nylon 6/6 filament. For example, a carpet tufted with filaments of untreated nylon-6, nylon-6 treated with a polycarboxylic compound as described above and nylon-6 filaments treated to improve acid dye receptivity can be inserted in a dye bath containing both acid dye and basic dye and each type of filament will dye in its own way. Thus a multi-colored carpet can be obtained from a single dye bath.

The polycarboxylic compounds of this invention are added to nylon-6 or nylon 6/6 by metering an effective amount into a nylon-6 chip stream to extrusion. Since it is essential to obtain good mixing of the polycarboxylic compound and polycaproamide, a screw extruder having a length/diameter ratio of at least 17 and a residence time of at least 5 minutes should be used. In the preferred embodiment the extruder has a length/diameter ratio of 20 and a residence time of 6 minutes. The polycaproamide may be in the form of chips or granules and the polycarboxylic compound should be in the molten state at a temperature of up to 40° above its melting point to avoid risk of freezing or excessive vaporization of the molten additive. Since a small amount of moisture may be contained in the polycaproamide chips and since water may be formed by reaction of the added polycarboxylic acid and the polyamide it is desireable to use a vented extruder. The moisture might adversely effect the viscosity of the resulting mixture and alter the draw-strength of the filaments.

One method of mixing the polycarboxylic compounds which reduces the chance of moisture contamination is to extrude polycaproamide containing from 5 to 30 weight percent of a polycarboxylic compound of this invention to form a masterbatch. This masterbatch which is dried can be mixed with further polycaproamide to give the desired concentration.

EXAMPLE I

Glutaric anhydride was mixed in powder form with nylon-6 chip to provide a mixture containing 0.5 weight percent of glutaric anhydride based on the weight of the nylon-6. The mix was extruded through a horizontal extruder having a length/diameter ratio of 20. The residence time of the mix in the extruder being approximately 5 minutes. The extruded nylon-6 was subsequently drawn at 3.5 draw ratio and crimped.

Knitted fabric samples were prepared from these filaments and compared with similar samples of untreated nylon-6 filaments in a basic dye bath.

Dyeing was carried out in a boiling aqueous solution of pH 7.5 containing 0.5 weight percent of Severon Red L. The filaments were maintained in the hot bath for 60 minutes. The nylon-6 filament containing glutaric anhydride showed deeper dyeing than the nylon-6 filament without the anhydride.

Nylon-6 containing various weight percent concentrations of glutaric anhydride were dyed with Severon Red L. The filament containing the highest concentration of anhydride showed deepest dyeing characteristics. It can be noted however in Table I below that none of these samples had as good yarn strength as untreated nylon-6.

TABLE I

| Concentration of Anhydride in Weight Percent | Spin Temp. in Degrees F | Yarn Relative Viscosity | Yarn Strength Retention after 150 hrs. Xenon Lamp Exp. |
|---|---|---|---|
| 0.5 | 460 | 2.48 | 80% |
| 1.0 | 435 | 2.33 | 78% |
| 2.0 | 420 | 2.00 | 35% |
| 0 | 525 | 2.75 | 90% |

EXAMPLE 2

Glutaric anhydride was metered via a precision pump into a nylon-6 chip stream of relative viscosity 2.70 at the entrance of an extruder. The anhydride was metered to provide a substantially constant concentration of 0.7 weight percent of anhydride based on the weight of nylon-6. The stream of mix extruded through a horizontal extruder having a length/diameter ratio of 17, the average residence time of the mix in the extruder being approximately 5 minutes. The extruded nylon-6 was subsequently drawn at 3.5 draw ratio and knitted into fabric samples in the manner described in EXAMPLE I.

The fabric samples were inserted into a bath of basic dye known as Severon Blue 2 G together with a fabric sample of untreated nylon-6. Dyeing was carried out in boiling aqueous solution of pH 7.5 and containing 0.5 weight percent of dyestuff. The samples were maintained in the hot dye bath for 60 minutes.

The sample containing glutaric anhydride dyed more deeply than the sample of untreated nylon-6.

EXAMPLE 3

Adipic acid was mixed with a nylon-6 chip stream of relative viscosity 2.7 and extruded, spun, drawn and knitted into fabric samples in the manner described in Example I. Samples were also prepared from nylon-6 mixed with succinic acid in the same manner.

The fabric samples prepared above were inserted in a bath of basic dye known as Severon Blue 2 G together with a fabric sample of untreated nylon-6. Dyeing was carried out in a boiling aqueous solution of pH 7.5 and containing 0.5 weight percent of dye-stuff. The samples were maintained in the hot dye bath for 60 minutes.

The samples containing succinic acid and adipic acid dyed more deeply than the sample of untreated nylon-6. The physical characteristics of the undyed filaments of Example 3 as compared to the filaments of untreated nylon-6 is given below in Table II.

TABLE II

| Additive Concentration in Weight Percent | Yarn Relation Viscosity | Strength Retention after 150 Hours Xenon Lamp Exposure |
|---|---|---|
| 0.5 Adipic Acid | 2.31 | 27% |
| 0.5 Succinic Acid | 2.27 | 88% |
| No Additive | 2.75 | 85% |

It can be seen from the above that while adipic acid gave good basic dye receptivity to the nylon, the strength retention of nylon-6 filament mixed with adipic acid is poor in comparison with untreated nylon-6. Nylon-6 mixed with an equivalent amount of succinic acid on the other hand gave good basic dye receptivity to the nylon and maintained its strength retention after light exposure. It can be seen from the above table that the nylon-6 mixed with succinic acid has as good or slightly better strength retention as untreated nylon-6.

EXAMPLE 4

Knitted fabric samples were prepared in the manner described in Example 2 using nylon-6 filaments mixed with various polycarboxylic compounds. The carpet samples were immersed in a hot aqueous bath containing 0.5 weight percent of Severon Red L for 60 minutes. The receptivity of these filaments to the basic dye is shown in Table III. The dyeing quality is described in the Table as "Very Deep, " "Deep," "Moderate," "Slight" and "Poor." This determination was made on the basis of comparison wherein a dyed nylon-6 sample containing 0.5 weight percent of succinic acid was taken as the standard of "Deep" dyeing properties, 2.0 weight percent of succinic anhydride was taken as the standard for "Very Deep" and a dyed untreated nylon-6 samples was taken as having "Poor" dyeing properties.

The strength of retention properties of the filaments after exposure under a Xenon lamp is made on the basis of comparison wherein an untreated nylon-6 sample is taken as having "Good" strength retention properties and a sample of nylon-6 mixed with 0.5 weight percent adipic acid is taken as the standard for Knitted fabric samples were prepared in the manner described in Example 2 using nylon-6 filaments mixed with various polycarboxylic compounds. The carpet samples were immersed in a hot aqueous bath containing 0.5 weight percent of Severon Red L for 60 minutes. The receptivity of these filaments to the basic dye is shown in Table III. The dyeing quality is described in the Table as "Very Deep," "Deep, " "Moderate," "Slight" and "Poor." This determination was made on the basis of comparison wherein a dyed nylon-6 sample containing 0.5 weight percent adipic acid is taken as the standard for "Poor" strength retention properties. A sample having strength retention properties approximately equivalent to a nylon-6 filament mixed with 1.0 weight percent of glutaric anhydride such as shown in Table I is taken as the standard for "Fair. "

TABLE III

| Concentration of Additive in Weight % | Basic Dye Receptivity | Strength Retention after 150 hours Xenon Lamp Exposure |
|---|---|---|
| 0.5 adipic acid | Deep | Poor |
| 0.3 adipic acid | Moderate | Poor |
| 0.1 adipic acid | Poor | Poor |
| 0.5 terephthalic acid | Deep | Good |
| 0.5 1,3,5-tricarboxypentane | Moderate | Good |
| 0.5 Glutaric anhydride | Deep | Good |
| 2.0 Glutaric anhydride | Very Deep | Fair |
| 0.5 methyl tetrahydrophthalic anhydride | Moderate | Fair |
| 1.0 succinic acid | Deep | Poor |
| 2.0 succinic anhydride | Very deep | Fair |

We claim:
1. A polycarbonamide filament having improved basic dye receptivity and desirable strength retention properties which consists essentially of:
polycaproamide having blended therein a polycarboxylic compound selected from the group consisting of glutaric acid, methyltetrahydrophthalic acid, 1,3,5-tricarboxypentane, glutaric anhydride and methyltetrahydrophthalic anhydride in an amount:
a. from 0.3 to 1.0 weight percent of polycarboxylic compound based on the weight of polycaproamide when said polycarboxylic compound is one selected from the group consisting of glutaric acid, methyltetrahydrophthalic acid and 1,3,5-tricarboxypentane,
b. from 0.3 to 2.0 weight percent of polycarboxylic compound based on the weight of polycaproamide when said polycarboxylic compound is one selected from the group consisting of glutaric anhydride and methyltetrahydrophthalic anhydride.

2. A polycarbonamide filament as claimed in claim 1 wherein the polycarboxylic compound is glutaric anhydride.

3. A polycarbonamide filament as claimed in claim 2 wherein the glutaric anhydride is present in an amount of from 0.5 to 1.0 weight percent based on the weight of polycaproamide.

4. A polycarbonamide filament as claimed in claim 1 wherein the polycarboxylic compound is methyl tetrahydrophthalic acid, said methyltetrahydrophthalic acid being present in an amount of from 0.5 to 1.0 weight percent based on the weight of polycaproamide.

5. A polycarbonamide filament as claimed in claim 1 wherein the polycarboxylic compound is 1,3,5-tricarboxypentane, said 1,3,5-tricarboxypentane being present in an amount of from 0.5 to 1.0 weight percent based on the weight of polycaproamide.

6. A polycarbonamide filament as claimed in claim 1 wherein the polycarboxylic compound is methyl tetrahydrophthalic anhydride, said methyl tetrahydrophthalic anhydride being present in an amount of from 0.5 to 1.0 weight percent based on the weight of polycaproamide.

* * * * *